United States Patent
Douglas (10) Patent No.: US 9,840,377 B2
(45) Date of Patent: Dec. 12, 2017

(54) DEFLECTOR FOR A CONVEYOR SYSTEM

(71) Applicant: Phillip Douglas, Fredericktown, OH (US)

(72) Inventor: Phillip Douglas, Fredericktown, OH (US)

(*) Notice: Subject to any disclaimer, the term of this patent is extended or adjusted under 35 U.S.C. 154(b) by 0 days.

(21) Appl. No.: 15/330,515

(22) Filed: Sep. 30, 2016

(65) Prior Publication Data

US 2017/0029222 A1    Feb. 2, 2017

Related U.S. Application Data

(60) Division of application No. 14/545,885, filed on Jul. 1, 2015, now Pat. No. 9,643,800, which is a continuation-in-part of application No. 13/999,396, filed on Feb. 21, 2014.

(60) Provisional application No. 61/850,770, filed on Feb. 23, 2013.

(51) Int. Cl.
| | |
|---|---|
| *B65G 53/34* | (2006.01) |
| *F16M 13/02* | (2006.01) |
| *B65G 53/60* | (2006.01) |
| *B65G 53/40* | (2006.01) |

(52) U.S. Cl.
CPC .......... *B65G 53/34* (2013.01); *B65G 53/40* (2013.01); *B65G 53/60* (2013.01); *F16M 13/02* (2013.01)

(58) Field of Classification Search
CPC ................................. B65G 53/34; B65G 53/40
USPC .......................................................... 406/168
See application file for complete search history.

(56) References Cited

U.S. PATENT DOCUMENTS

| | | | |
|---|---|---|---|
| 521,619 A | 6/1894 | Jordan | |
| 956,393 A | 4/1910 | Mechling | |
| 1,671,706 A | 5/1928 | Evans | |
| 1,861,295 A * | 5/1932 | Bramwell | ............ B01D 24/002 |
| | | | 210/189 |
| 2,003,159 A | 5/1935 | Taylor | |
| 2,395,410 A | 2/1946 | Kaesler | |
| 2,875,968 A | 3/1959 | Ekola | |
| 2,942,820 A | 6/1960 | Sherburne | |
| 3,206,905 A | 9/1965 | Wavering et al. | |
| 3,257,010 A | 6/1966 | Fickle et al. | |
| 3,306,261 A | 2/1967 | Purdy | |
| 3,675,796 A | 7/1972 | Atkinson et al. | |

(Continued)

FOREIGN PATENT DOCUMENTS

FR    1108436    1/1956

OTHER PUBLICATIONS

Sukup® brochure No. L1189-052014, Sukup Manufacturing Co., Sheffield, Iowa, 1 sheet, 4 pages; 2014.

*Primary Examiner* — Joseph A Dillon, Jr.
(74) *Attorney, Agent, or Firm* — Andrew C. Pike (57) ABSTRACT

A system protects an outlet of a pneumatic conveyor. The outlet has a horizontal section. The system comprises a deflector for protecting the horizontal section, and sets of stanchions therefor respectively attached to clamp assemblies mounted on the horizontal section. The deflector comprises angled walls, a plurality of crossbeams interconnecting the angled walls for reinforcing the deflector, and an end flange. Each stanchion has a foot. Each clamp assembly comprises two equal halves, fasteners joining together the equal halves, and a flange for each equal half perpendicular thereto. The system further comprises fasteners each attaching one foot to one flange, respectively.

11 Claims, 6 Drawing Sheets

(56) References Cited

U.S. PATENT DOCUMENTS

| | | | | |
|---|---|---|---|---|
| 3,689,119 A * | 9/1972 | Weichel | ............... | A01F 25/186 |
| | | | | 406/162 |
| 4,018,674 A * | 4/1977 | Morris | ................ | A24B 1/04 |
| | | | | 131/312 |
| 4,117,547 A | 9/1978 | Mathis et al. | | |
| 4,199,913 A * | 4/1980 | Hood | ................ | A01D 46/243 |
| | | | | 53/244 |
| 4,204,595 A | 5/1980 | Marrs | | |
| 4,240,772 A | 12/1980 | Wyatt | | |
| 4,414,100 A * | 11/1983 | Krug | ................ | B01J 8/005 |
| | | | | 208/153 |
| 4,580,927 A * | 4/1986 | Weeks | ................ | B65G 53/40 |
| | | | | 406/119 |
| 4,643,292 A * | 2/1987 | Whited | ................ | B65G 47/766 |
| | | | | 119/57.7 |
| 4,776,789 A * | 10/1988 | Ehrich | ................ | A47J 37/044 |
| | | | | 432/129 |
| 4,823,937 A | 4/1989 | Page | | |
| 4,934,537 A * | 6/1990 | DeBourke | ................ | B07C 5/10 |
| | | | | 198/367 |
| 5,088,871 A * | 2/1992 | Mellish | ................ | B65G 65/42 |
| | | | | 198/550.8 |
| 5,131,798 A * | 7/1992 | Bell | ................ | E01B 27/00 |
| | | | | 105/269 |
| 5,226,775 A * | 7/1993 | Bohle | ................ | B65B 37/02 |
| | | | | 193/32 |
| 5,246,102 A * | 9/1993 | Rappen | ................ | B65G 15/08 |
| | | | | 198/819 |
| 5,682,977 A | 11/1997 | White | | |
| 5,695,069 A * | 12/1997 | Mortrud | ................ | B02C 19/0068 |
| | | | | 209/135 |
| 6,227,357 B1 | 5/2001 | Brown, Sr. | | |
| 6,264,022 B1 * | 7/2001 | Petack | ................ | B65G 15/16 |
| | | | | 198/626.4 |
| 6,585,105 B2 * | 7/2003 | Valcalda | ................ | B65G 15/18 |
| | | | | 198/626.2 |
| 6,797,239 B1 * | 9/2004 | Chen | ................ | C10G 11/182 |
| | | | | 422/144 |
| 7,303,059 B2 * | 12/2007 | Pugh | ................ | B65G 47/256 |
| | | | | 198/434 |
| 8,007,610 B2 * | 8/2011 | Schneider | ................ | B27N 1/0263 |
| | | | | 156/62.2 |
| 8,497,447 B2 * | 7/2013 | Heiml | ................ | B23K 37/047 |
| | | | | 219/121.41 |
| 8,770,537 B2 * | 7/2014 | Go | ................ | E02F 9/2275 |
| | | | | 212/347 |
| 2004/0140177 A1 * | 7/2004 | Loesche | ................ | B02C 23/02 |
| | | | | 198/626.2 |
| 2014/0124339 A1 | 5/2014 | Murphy et al. | | |
| 2014/0237981 A1 * | 8/2014 | Roberge | ................ | A01D 87/02 |
| | | | | 56/341 |
| 2014/0377042 A1 * | 12/2014 | McMahon | ................ | B65G 63/008 |
| | | | | 414/293 |

\* cited by examiner

DEFLECTOR FOR A CONVEYOR SYSTEM

CROSS-REFERENCE TO RELATED APPLICATIONS

This application is a divisional of application Ser. No. 14/545,885 filed Jul. 1, 2015, now U.S. Pat. No. 9,643,800, which is a continuation-in-part of application Ser. No. 13/999,396 filed Feb. 21, 2014, which claims the benefit of provisional application No. 61/850,770 filed Feb. 23, 2013, all of which are incorporated by reference.

BACKGROUND OF THE INVENTION

Field of the Invention

The present invention relates to the delivery of material being transported by a conveyor entraining the material within a flow of fluid, and in particular to the depositing of granular material by a pneumatic conveyor into a storage silo; and further relates to the deflector of the system for delivery of the material being so conveyed for protecting the horizontal section of the system from damage that may occur due to the material.

Background Art

Fluid flow conveyors, particularly pneumatic conveyor systems, have become a popular alternative to augers and belt conveyors for the movement of granular materials. Pneumatic conveyor systems are especially suitable for farm grains for the following reasons: grain is carried within a stream of air for less grain damage; a pneumatic conveyor is more economical to install; a pneumatic conveyor is more versatile for multiple silos and multiple silo types at a storage facility; pneumatic conveyors are sealed against water and pest infiltration between receiving point to delivery of the grain; one pneumatic conveyor system can be utilized to move a variety of grain types without cross contamination, simply by turning a valve distributor between silos; and pneumatic conveyor systems are easier to maintain.

Prior art pneumatic conveyor systems delivering grain to the top of storage silos introduce problems for these systems: a cyclone separator is required for the top of each silo; the entire system is exterior of the silo, exposing the machinery to weather-related damage; exterior supports that may be expensive must be used to support the pneumatic conveyor tubing; roof-mounted supports for the pneumatic conveyor and separator exert forces that tend to pull down the silo and collapse it; much of the pneumatic conveyor system is high above ground and not easily serviced; grain-to-grain damage occurs due to the falling of grain from the silo top to the bottom of the silo, which only increases with the height of the silo; and mixed granular materials experience product separation when dropped from the top of a silo.

Furthermore, an efficiency loss of approximately ten percent for every twenty-five feet (seven and one-half meters) of vertical rise is common to all pneumatic conveyor systems. For example, a pneumatic conveyor system used to fill a silo one hundred feet (thirty meters) tall would operate at 40% less than full efficiency (100 ft×(10%/25 ft)=40% loss; 30 m×(10%/7.5 m)=40% loss).

U.S. Pat. No. 4,082,364, Apr. 4, 1978, to Krambrock describes a method for sequentially filling a series of receiving stations from the tops thereof using a pneumatic conveyor, wherein each station is filled until the surface of the deposited material therewithin is just below the inlet thereof from the pneumatic conveyor and then this surface acts as a deflecting surface to direct the airflow entraining the material onto the next station.

U.S. Pat. No. 6,632,063, Oct. 14, 2003, to Karlsen et al. describes a system for reducing material segregation between finer and coarser material during filling of a silo from its top by controlling the entraining airflow to be a minimum, wherein the material within the silo as it is being filled can eventually reach the level of the outlet of the system for the material.

U.S. Pat. No. 4,603,769, Aug. 5, 1986, to Bach et al. describes a vertical chute for reducing grain dust with a series of vertically aligned outlets for filling a silo from its top, wherein the deposited grain blocks each outlet sequentially from lower to upper as the silo is filled.

The article *Pneumatic Conveying Systems*, course No. M05-010, no date, by A. Bhatia of Continuing Education and Development, Inc. discusses the present state of the art of pneumatic conveyors; and defines "choking" as the settling out downwardly of the entrained material from the entraining airflow when the airflow is flowing upwardly vertically in vertically oriented conveying piping, particularly before reaching the conveyor's destination and thus is to be avoided.

SUMMARY OF THE INVENTION

An objective of the present invention is to remove a major source of contamination into storage silos due to pneumatic conveyor systems by eliminating rooftop delivery of the material by the pneumatic conveyor.

Another objective is to reduce the expense of pneumatic conveyor systems by eliminating the components for rooftop delivery such as a cyclone separator and exterior supports for the pneumatic tubes.

Another objective is to increase the ease of maintenance of pneumatic conveyor systems by routing the pneumatic tubes connected to a storage silo near ground level.

Another objective is to protect the delivery system for a storage silo connected to a pneumatic conveyor from weather-related damage by locating and supporting the delivery system within the silo.

Another objective is to reduce grain-to-grain damage, and also product separation of mixed granular materials, by reducing the height through which the materials drop when deposited within a storage silo.

Another objective is to reinforce a storage silo against collapse due to the added weights and forces of the delivery system and the granular material when stored within the silo.

Another objective is to more evenly distribute the supported weight and forces of the delivery system for a storage silo and the granular material when stored within the silo, while also providing for an unobstructed floor area for mechanical or manual sweeping of the silo floor.

Another objective is to protect the horizontal section of the delivery system for a storage silo connected to a pneumatic conveyor from damage that may occur due to the material.

The delivery system of the present invention delivers material being transported by a conveyor entraining the material within a flow of fluid. The system comprises a horizontal section and a vertical section. The vertical section comprises a tube for receiving the fluid flow entraining the material, and separators for selectively separating the material from the fluid flow. A support vertically suspends the system within a storage silo. The tube, the separators, and the support are all within the silo.

The support suspends the system vertically within the silo from bottom to top, wherein the next separator that is downstream is located above the preceding separator that is upstream thereof, respectively. The support has a vertical support that suspends and centers the system within the silo, and a horizontal support that selectively supports the system upon the silo floor. The vertical support comprises clamp assemblies, and a set of braces for each respective clamp assembly. The horizontal support comprises clamp assemblies mounted on the horizontal section of the system, and removable support legs attachable to the horizontal support in either deployed positions or stored positions.

The deflector of the present invention protects the horizontal section of the system from damage that may occur due to the material within the silo. Clamp assemblies are mounted on the horizontal section. Stanchions connect the deflector with the clamp assemblies on the horizontal section. The deflector comprises angled walls, and crossbeams interconnecting the walls for reinforcing the deflector. A flange of the deflector is fastened to the silo wall for supporting one end of the deflector. Each stanchion comprises a lower end, and a foot attached to the lower end. Each clamp assembly on the horizontal section comprises two equal halves each having two ends and an outer side having an outer surface, fasteners joining together the equal halves, and a flange for each equal half perpendicular to the outer surface of the side thereof. Fasteners each attaches one foot to one clamp assembly flange, respectively.

The present invention reduces the average drop height of the separated material. This reduces grain-to-grain damage and also product separation of mixed granular materials. The reduction in average drop height of the separated material also increases the efficiency of the pneumatic conveyor system. Whereas a prior art pneumatic conveyor system having rooftop delivery of the material typically would have, for example, for a one-hundred-foot (thirty-meter) high silo a 40% loss of efficiency (as hereinbefore stated), the present invention with four separators bottom to top for the same silo would have a calculated loss of only 25% ((10%+20%+30%+40%)/4)=25%). This is an increase of delivery efficiency by fifteen percentage points, or 25% (((100%−25%)−(100%−40%))/(100%−40%)=125%).

An additional advantage of the present invention over the prior art is the simplicity of operation, with the separators acting automatically and with no moving parts being required for the delivery system.

DETAILED DESCRIPTION OF THE INVENTION

Figure 1:
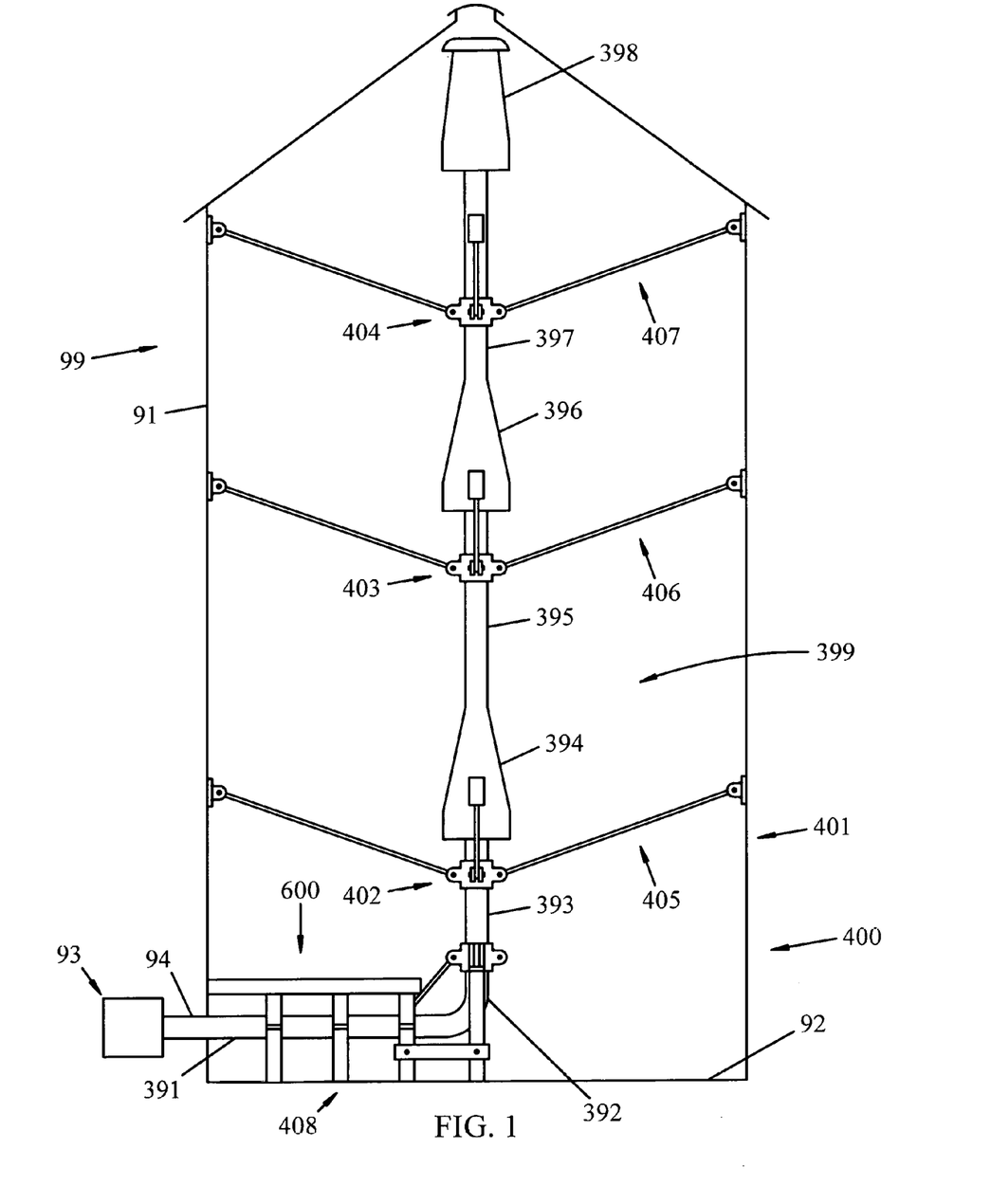
FIG. 1 is a schematic side view of one embodiment of the present invention within a storage silo comprising a vertical support comprising three clamp assemblies with braces and wall brackets, a horizontal support comprising four clamp assemblies with support legs, and a deflector.

The present invention is supported within a vertical storage silo 99 having a wall 91 and a floor 92 as shown schematically in FIG. 1. The silo 99 is for the removable storage of granular material, for example grain, that, when so stored, has a material surface (not shown). Although the present invention is contemplated primarily for grain, the intent of the claimed invention is to be construed to include all manner of granular material. Pelletized food products, fuels, coal, animal feeds, plastics, and fiber products are a few of the other items suitable for pneumatic conveying for removable storage.

The present invention delivers the material to the silo 99 when the material is transported by a conveyor entraining the material within a flow of fluid. One embodiment of the present invention is contemplated to be used with a conventional pneumatic conveyor system that entrains the material within a flow of air for depositing the material into the silo 99.

A conventional pneumatic charging system is shown generally in FIG. 1 as pneumatic conveyor 93. Pneumatic conveyor 93 is known in the art. Typically, a blower (not shown) supplies a flow of air to a rotary airlock (not shown). The rotary airlock entrains the material to be conveyed into the airflow creating a pneumatic material flow that is a mixture of the airflow entraining the conveyed material to be propelled toward the silo 99. The pneumatic conveyor 93 connects to a tube 94 for conveying of the pneumatic material flow. The tube 94 is a pneumatic transfer tube known in the art.

The present invention comprises an outlet of the pneumatic conveyor 93. One embodiment of the present invention is shown schematically in FIG. 1 as, generally, a delivery system 399. The delivery system 399 has a horizontal section and a vertical section and at least an elbow interconnecting the horizontal and vertical sections that together comprise a series of tubes and separators within the silo 99. A support system 400 supports the delivery system 399 within the silo 99. The tube 94 connects to a horizontal tube 391 of the horizontal section of the delivery system 399 for conveying the pneumatic material flow into the silo 99. The horizontal tube 391 may be slightly angled from being exactly horizontal, either upwardly or downwardly, to improve and maintain the pneumatic material flow to provide maximum conveyance of the material. The horizontal tube 391 enters the silo 99 through a lower portion of the silo wall 91. An elbow 392 interconnects the horizontal tube 391 and a vertical tube 393 of the vertical section for conveying the pneumatic material flow upwardly within the silo 99. The vertical tube 393 is located at and along the vertical center of the silo 99.

The vertical tube 393 is connected to an upstream separator 394 of the vertical section of the delivery system 399 by slipping into the upstream separator 394. The upstream separator 394 comprises a vertical tube 395 for conveying the pneumatic material flow upwardly from the upstream separator 394. The upstream separator 394 selectively either separates the material from the airflow and deposits the separated material into the silo 99; or else flows the pneumatic material flow through the upstream separator 394, without separating the material from the airflow, and into the vertical tube 395.

In the embodiment shown in FIG. 1, the vertical tube 395 is connected to a downstream separator 396 of the vertical section of the delivery system 399 by slipping into the downstream separator 396. The downstream separator 396 is vertically above the upstream separator 394 and downstream of the upstream separator 394. The downstream separator 396 comprises a vertical tube 397 for conveying the pneumatic material flow upwardly from the downstream separator 396. The downstream separator 396 selectively either separates the material from the airflow and deposits the separated material into the silo 99 onto the separated material deposited by the upstream separator 394; or else flows the pneumatic material flow through the downstream separator 396, without separating the material from the airflow, and into the vertical tube 397.

The vertical tube 397, in the embodiment shown in FIG. 1, connects to a top separator 398 of the vertical section of the delivery system 399 that is vertically above both the upstream separator 394 and the downstream separator 396 and that is downstream of the downstream separator 396. The top separator 398 comprises an open cap on the top of the top separator 398. The top separator 398 selectively either separates the material from the airflow and deposits the separated material into the silo 99 onto the separated material deposited by both the upstream separator 394 and the downstream separator 396; or else flows the pneumatic material flow through the top separator 398, without separating the material from the airflow, toward the cap.

One embodiment, not shown, of a material separator of the present invention that is not a top separator, that, for the embodiment shown in FIG. 1, can be any separator of the delivery system 399 that is not the top separator 398, has an inlet, an outlet below the inlet, and a cylindrical outlet tube above the inlet. The outlet tube is generally cylindrical in its entirety, and has the same outside diameter as the outside diameter of the vertical tube. For the embodiment shown in FIG. 1, the outlet tube can be any of the vertical tube that any of the separators of the delivery system 399, that is not the top separator 398, comprises. The material separator includes an inlet tube forming the inlet at the upper end of the inlet tube. The lower end of the inlet tube is below the outlet. The inside diameter of the inlet tube is greater than the outside diameter of the vertical tube. The vertical tube thus slips into the inlet tube of the material separator. The material separator has a metal wall that interconnects the outlet and the outlet tube. The wall forms a cylindrical base and a forcing cone above the cylindrical base. The inside diameter of the cylindrical base is greater than the outside diameter of the inlet tube, forming the outlet at the lower end of the cylindrical base. A plurality of webs structurally interconnect and space apart the cylindrical base and the inlet tube, thus together with the inlet tube and the wall interconnecting together the inlet, the outlet, and the outlet tube. The forcing cone tapers upwardly and inwardly to the outlet tube, forming a through aperture between the forcing cone and the outlet tube. The inlet, the outlet, the inlet tube, the cylindrical base, essentially the entire forcing cone, and the webs are all vertically below the through aperture on the proximal side of the through aperture. Essentially the entire outlet tube is vertically above the through aperture on the distal side of the through aperture.

The material separator, the inlet, the outlet, the through aperture, the outlet tube, and the inlet tube are coaxial. The relative sizes of the material separator may be different based upon which specific granular material is primarily to be delivered to the silo 99. For example, for grain, in the embodiment of the material separator, the cylindrical base has an inside diameter about three times the outside diameter of the inlet tube, and the axial distance between the outlet and the through aperture is approximately six times the diameter of the inlet.

In one embodiment, not shown, of the top separator of the present invention, a vertical tube conveys the pneumatic material flow upwardly, from upstream of the top separator 398, downstream into the top separator 398. The vertical tube conveys the pneumatic material flow from the uppermost material separator of the delivery system 399 that is not the top separator 398. For the embodiment shown in FIG. 1, that vertical tube is the vertical tube 397 shown in FIG. 1 that the downstream separator 396 (which is the uppermost separator that is not the top separator 398) of the delivery system 399 comprises.

The top separator has an inlet, a first outlet below the top separator inlet, and a second outlet above the top separator inlet. The vertical tube extends into and terminates within the top separator forming the top separator inlet at the upper end of the vertical tube. The top separator has a metal wall that interconnects the first and second outlets thereof. The wall forms a cylindrical base and a cone above this cylindrical base. The inside diameter of this cylindrical base is greater than the outside diameter of the vertical tube, forming the first outlet of the top separator at the lower end of this cylindrical base. A plurality of webs structurally interconnect and space apart this cylindrical base and the vertical tube, thus together with the vertical tube and the top separator wall interconnecting together the inlet thereof, the first outlet thereof, and the second outlet thereof. The top separator cone tapers upwardly and inwardly to a diameter about two times the diameter of the top separator inlet at the top separator second outlet. An open cap is at the top separator second outlet and has a stem. A plurality of webs interconnect and space apart the stem and the top separator cone at the top separator second outlet, centering the stem into the top separator second outlet. The open cap is mushroom shaped, blocking continued vertical flow, and redirects any flow through the top separator second outlet downwardly and out of the top separator.

The top separator, the inlet thereof, the first outlet thereof, and the second outlet thereof are coaxial. The relative sizes of the top separator may be different based upon which specific granular material is primarily to be delivered to the silo 99. For example, for grain, in the embodiment of the top separator, the cylindrical base thereof has an inside diameter about three times the outside diameter of the vertical tube. The overall height of the top separator is about six times the diameter of the inlet thereof.

The support system 400 comprises a vertical support 401 and a horizontal support 408. The vertical support 401 suspends and centers the delivery system 399 within the silo 99, and reinforces the silo 99 against collapse. The horizontal support 408 selectively supports the delivery system 399 upon the floor 92 of the silo 99. The supported weight and forces of the delivery system 399 and the material when stored within the silo 99 are distributed between the vertical support 401 and the horizontal support 408.

The vertical support 401 has a plurality of clamp assemblies mounted on the vertical tubes of the vertical section of the delivery system 399; and in particular, for the embodiment shown in FIG. 1, clamp assemblies 402, 403, and 404. The clamp assembly 402 is positioned on the vertical tube 393 near the upstream separator 394 for suspending and centering the vertical tube 393 within the silo 99. The clamp assembly 403 is positioned on the vertical tube 395 near the downstream separator 396 for suspending and centering the vertical tube 395 and the upstream separator 394 within the silo 99. The clamp assembly 404 is positioned on the vertical tube 397 for suspending and centering the vertical tube 397 and the downstream separator 396 within the silo 99. The vertical support 401 further includes wall brackets on the silo wall 91, and sets 405, 406, and 407 of braces interconnecting the clamp assemblies 402, 403, and 404, respectively, with the wall brackets on the silo wall 91, thereby suspending and centering the vertical tubes and the separators of the delivery system 399 within the silo 99. The braces of each set of braces of the vertical support 401 are evenly spaced around the respective vertical tube. For each clamp assembly, the respective wall brackets are evenly spaced on, and connected to, the inner surface of the silo wall 91 on a horizontal plane above the height of the clamp assembly thereof. The silo wall 91 is thus interconnected throughout and within the silo 99 by the vertical support 401, specifically, for the embodiment shown in FIG. 1, the clamp assemblies 402, 403, and 404, the sets 405, 406, and 407 of the braces, and the respective wall brackets therefor, simultaneously reinforcing the silo wall 91 against collapse of the silo 99 as well as supporting the delivery system 399.

The clamp assemblies of the vertical support 401 are identical with each other. Each clamp assembly of the vertical support 401 includes a clamp. Each clamp has an inside circumference less than the outside circumference of the respective vertical tube. Each clamp is composed of metal plate or metal casting. Each clamp is a union of two equal half clamps. Each half clamp has an outwardly radiating end flange on one end for forming an end bracket, and an outwardly radiating end flange on the other end for forming another end bracket. Each half clamp also has one or more side brackets evenly spaced between the ends of that half clamp. Each side bracket has two flanges closely spaced to, and parallel with, each other. Each side bracket has one aligning through hole formed by aligned holes in the flanges thereof. When the half clamps for each clamp are mounted onto the respective vertical tube, the end flanges of those half clamps are adjacent to each other, forming the end brackets thereof. Aligning through holes of the end brackets thereof are formed by aligned holes in the end flanges, respectively.

The wall brackets of the vertical support 401 are identical with each other. Each wall bracket is a metal or metal casting fixture. Each wall bracket has a base and two parallel flanges. Each of the flanges has aligned holes, forming an aligning through hole. Each wall bracket base has two or more holes. The wall brackets are mechanically fastened or bolted to the silo wall 91.

The sets of the braces of the vertical support 401 are identical with each other. Each brace is a metal rod or cable having two end holes, one each for the inner end thereof and the outer end thereof, for receiving fasteners or bolts as connectors and are secured, as by nuts when bolts are used. Each brace has a length equal to or greater than the radius of the silo 99, and extends radially upwardly and outwardly from the clamp assembly thereof to the wall brackets. The clamp brackets each receives the inner end of one of the braces, respectively, and retains that inner end therein by a bolt passing through the aligning through hole of the clamp bracket and the inner end hole of the brace, respectively. The wall brackets each receives the outer end of one of the braces, respectively, and retains that outer end therein by a bolt passing through the aligning through hole of the wall bracket and the outer end hole of the brace, respectively. The braces thus equally connect the brackets of each of the clamps of the clamp assemblies of the vertical support 401 to the silo wall 91.

Figure 2:
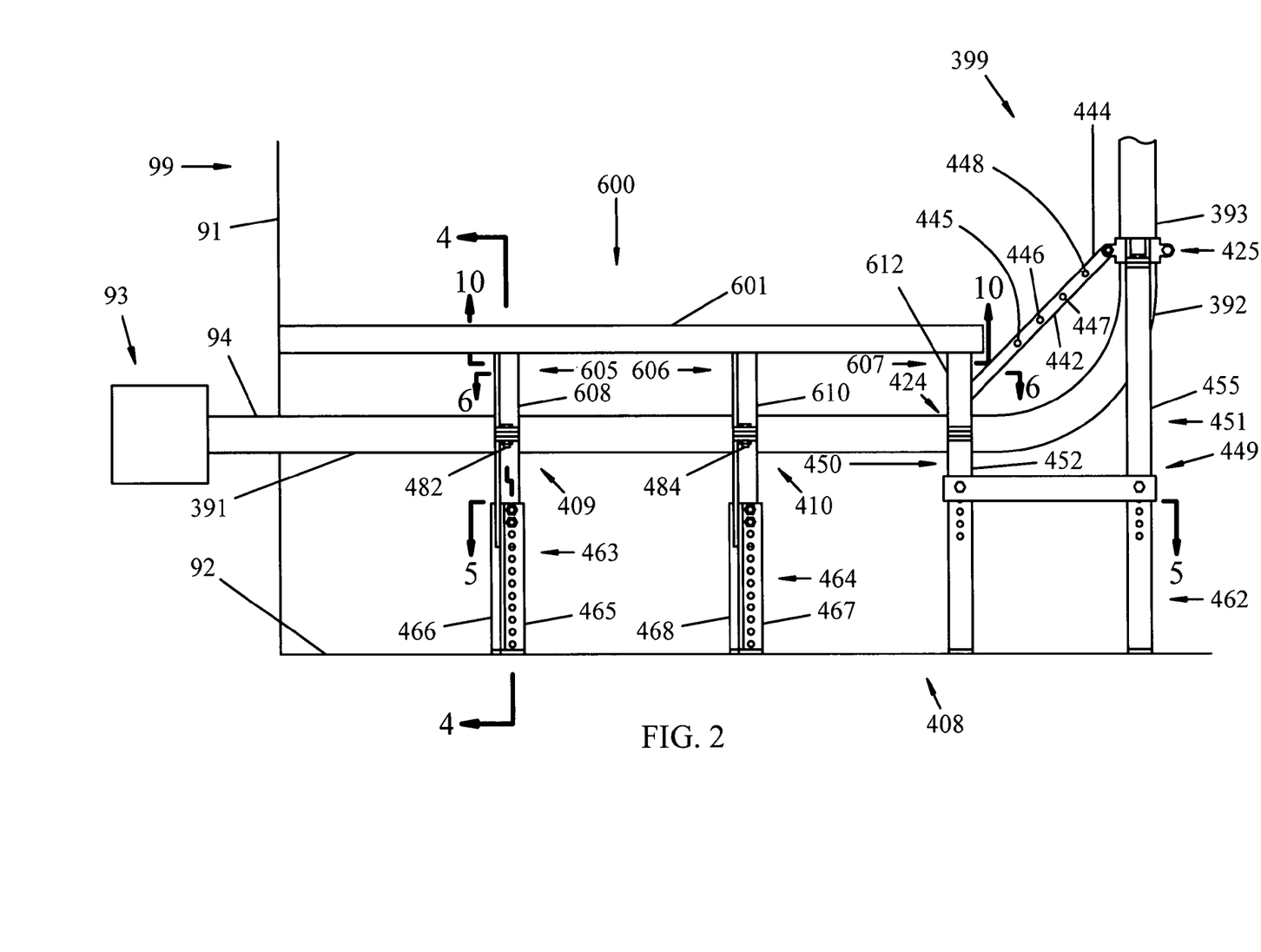
FIG. 2 is a side view of the embodiment of the present invention, as shown in FIG. 1, within the storage silo, partly schematically and broken, showing the horizontal support comprising four clamp assemblies, support legs in deployed positions, a subframe, stanchions, and a deflector.

The horizontal support 408 has a plurality of clamp assemblies mounted on the horizontal tube 391 of the horizontal section of the delivery system 399; and in particular, for the embodiment shown in FIG. 2, clamp assemblies 409 and 410. The clamp assemblies of the horizontal support 408 mounted on the horizontal tube 391 are identical with each other; and, as such, the clamp assembly 409 is typical. The clamp assembly 409 is shown in greater detail in FIG. 4.

Figure 4:
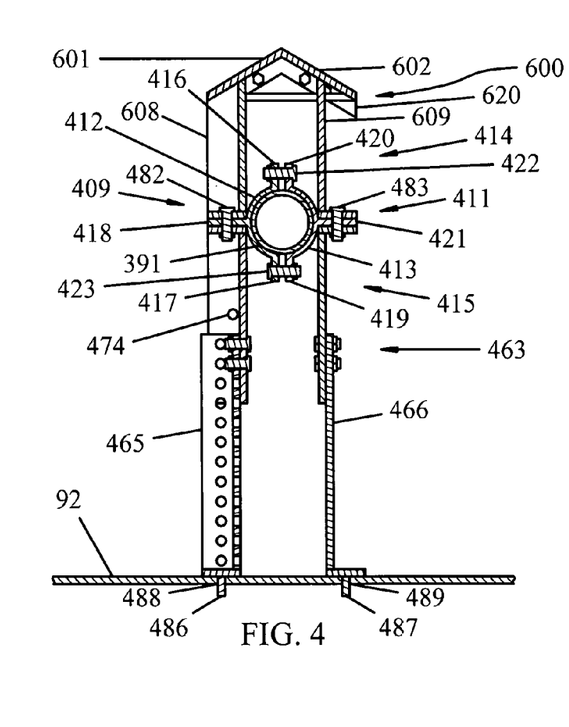
FIG. 4 is a cross-sectional view, partly broken, taken on the offset cross-sectional line 4-4 in FIG. 2 showing one clamp assembly and the support legs thereof of the horizontal support, and the deflector and one set of the stanchions thereof.

The clamp assembly 409 comprises a clamp 411 having an inside circumference less than the outside circumference of the horizontal tube 391. The clamp 411 is composed of metal plate or metal casting. The clamp 411 is a union of two equal half clamps 412 and 413.

The half clamp 412 has an outwardly radiating end flange 416 on one end for forming an end bracket 414, and an outwardly radiating end flange 417 on the other end for forming an end bracket 415. The half clamp 412 has a side flange 418 evenly spaced between the ends of the half clamp 412 that is radially perpendicular to the outer surface of the half clamp 412, extending across the width of the half clamp 412. Each of the flanges 416, 417, and 418 has a through hole therein.

The half clamp 413 has an outwardly radiating end flange 419 on one end for forming the end bracket 415, and an outwardly radiating end flange 420 on the other end for forming the end bracket 414. The half clamp 413 has a side flange 421 evenly spaced between the ends of the half clamp 413 that is radially perpendicular to the outer surface of the half clamp 413, extending across the width of the half clamp 413. Each of the flanges 419, 420, and 421 has a through hole therein.

When the half clamps 412 and 413 are mounted onto the horizontal tube 391, as shown in FIG. 4, the end flange 416 of the half clamp 412 and the end flange 420 of the half clamp 413 are adjacent to each other, forming the end bracket 414; and the end flange 417 of the half clamp 412 and the end flange 419 of the half clamp 413 are adjacent to each other, forming the end bracket 415. The through holes in the end flanges 416 and 420 are aligned, forming an aligning through hole of the end bracket 414; and the through holes in the end flanges 417 and 419 are aligned, forming an aligning through hole of the end bracket 415. Fasteners or bolts 422 and 423 pass through the through holes of the end brackets 414 and 415, respectively, and are secured, as by nuts when bolts are used, joining together the half clamps 412 and 413 to form the clamp 411.

Figure 3:
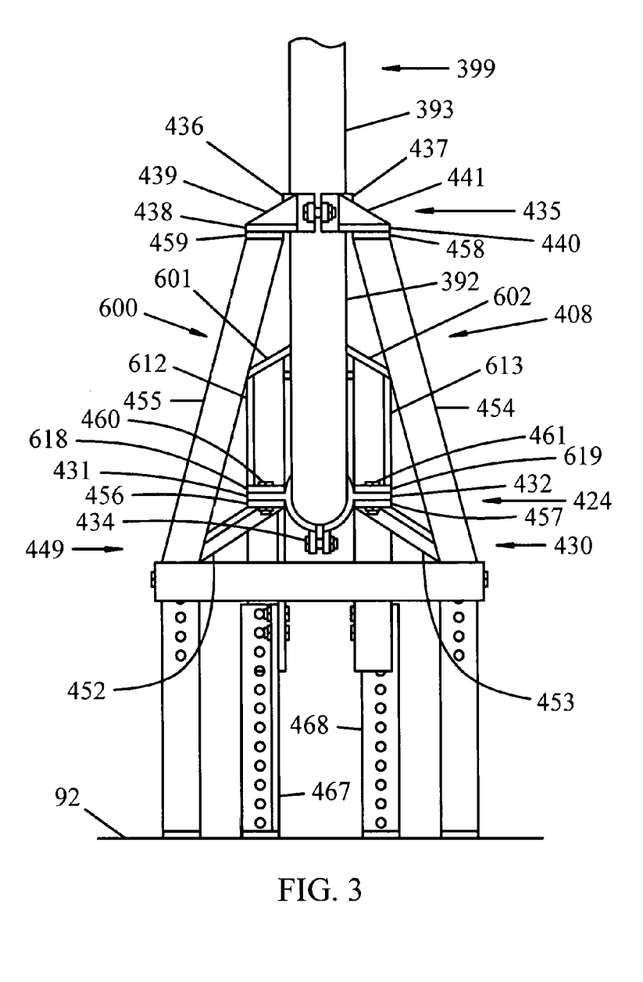
FIG. 3 is an end view of the embodiment of the present invention, as shown in FIG. 2, showing the horizontal support and the deflector.
Figure 6:
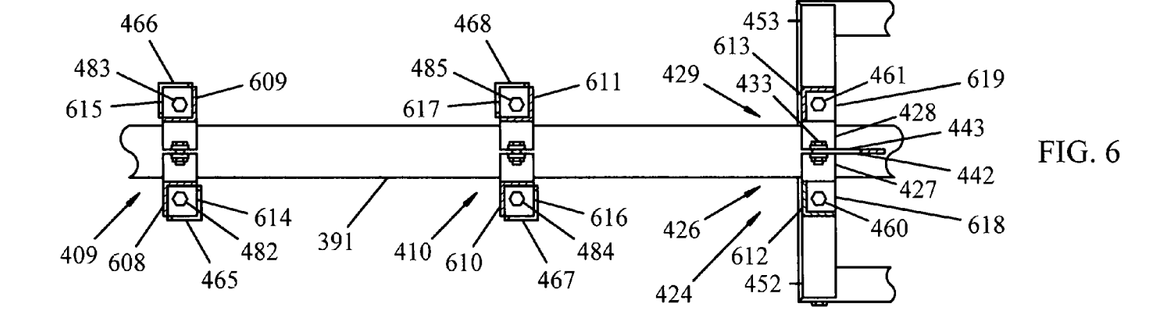
FIG. 6 is a cross-sectional view, partly broken, taken on line 6-6 in FIG. 2 showing the stanchions of the horizontal support and the deflector.

As shown in FIG. 2 and FIG. 3, the horizontal support 408 further includes a horizontal elbow clamp assembly 424 mounted on the horizontal tube 391 adjacent the elbow 392, and a vertical elbow clamp assembly 425 mounted on the vertical tube 393 adjacent the elbow 392. The horizontal elbow clamp assembly 424, shown in FIG. 2, FIG. 3, and FIG. 6, is identical with the clamp assemblies of the horizontal support 408 mounted on the horizontal tube 391; and comprises, identically, a clamp 426 that is a union of two equal half clamps 427 and 428 joined together by fasteners or bolts 433 and 434 passing through through holes of end brackets 429 and 430, respectively, that are secured, as by nuts when bolts are used. Each half clamp 427 and 428 likewise identically has a side flange 431 and 432, respectively, having a through hole therein.

The vertical elbow clamp assembly 425, as shown in FIG. 2 and FIG. 3, comprises a clamp 435 having an inside circumference less than the outside circumference of the vertical tube 393. The clamp 435 is composed of metal plate or metal casting. The clamp 435 is a union of two equal half clamps 436 and 437.

The half clamp 436 has an outwardly radiating end flange on one end for forming an end bracket, and an outwardly radiating end flange on the other end for forming another end bracket. The half clamp 436 has a side flange 438. The side flange 438 is circumferentially perpendicular to the outer surface of the half clamp 436, extending along the circumferential arc length between the ends of the half clamp 436, and projects horizontally outwardly from the side of the half clamp 436. The side flange 438 is located at about the lower edge of the half clamp 436, and evenly spaced between the ends of the half clamp 436. Reinforcing gussets 439, generally triangularly shaped, interconnect the upper surface of the side flange 438 and the outer surface of the half clamp 436 for reinforcing the side flange 438 from deflecting vertically. Each of the end flanges and the side flange 438 of the half clamp 436 has a through hole therein.

The half clamp 437 has an outwardly radiating end flange on one end for forming one of the end brackets of the clamp 435, and an outwardly radiating end flange on the other end for forming the other end bracket of the clamp 435. The half clamp 437 has a side flange 440. The side flange 440 is circumferentially perpendicular to the outer surface of the half clamp 437, extending along the circumferential arc length between the ends of the half clamp 437, and projects horizontally outwardly from the side of the half clamp 437. The side flange 440 is located at about the lower edge of the half clamp 437, and evenly spaced between the ends of the half clamp 437. Reinforcing gussets 441, generally triangularly shaped, interconnect the upper surface of the side flange 440 and the outer surface of the half clamp 437 for reinforcing the side flange 440 from deflecting vertically. Each of the end flanges and the side flange 440 of the half clamp 437 has a through hole therein.

When the half clamps 436 and 437 are mounted onto the vertical tube 393, one end flange of the half clamp 436 and one end flange of the half clamp 437 are adjacent to each other, forming one end bracket; and the other end flange of the half clamp 436 and the other end flange of the half clamp 437 are also adjacent to each other, forming the other end bracket. The through holes in the adjacent end flanges are aligned, forming aligning through holes of the end brackets, respectively. Fasteners or bolts pass through the through holes of the end brackets, respectively, and are secured, as by nuts when bolts are used, joining together the half clamps 436 and 437 to form the clamp 435.

The horizontal support 408 further includes an elbow brace 442 interconnecting the horizontal elbow clamp assembly 424 and the vertical elbow clamp assembly 425 above the elbow 392, as shown in FIG. 2, for reinforcing the elbow clamp assemblies 424 and 425. The elbow brace 442 is a metal rod or bar having a lower end 443, an upper end 444, and two end holes, one each for the ends 443 and 444 thereof, for receiving one of the fasteners or bolts respectively joining together the half clamps of the elbow clamp assemblies. The elbow brace 442 has a plurality of storing holes 445, 446, 447, and 448 along the length thereof. The clamp end bracket 429 of the horizontal elbow clamp assembly 424 receives the lower end 443 of the elbow brace 442 and retains the lower end 443 therein by the bolt 433 passing through the through hole of the clamp end bracket 429 and the lower end hole of the elbow brace 442. One of the clamp end brackets of the vertical elbow clamp assembly 425 receives the upper end 444 of the elbow brace 442 and retains the upper end 444 therein by the bolt passing through the through hole of this clamp end bracket and the upper end hole of the elbow brace 442.

The horizontal support 408 further includes a subframe 449 that also interconnects and reinforces the horizontal elbow clamp assembly 424 and the vertical elbow clamp assembly 425. The subframe 449 is below the elbow 392, and extends underneath and between the horizontal elbow clamp assembly 424 and the vertical elbow clamp assembly 425.

The subframe 449 comprises a plurality of interconnected girders. The subframe 449 has a generally rectangular plan shape, either of unequal length and width or equal length and width forming a square. Each of the girders is metal and has an angle cross section of either unequal or equal flange length, and may be angle iron for ease and simplicity of construction. Each of the girders has a first of the flanges thereof oriented horizontally and on top, and a second of the flanges thereof oriented vertically and on the outer side of the subframe 449. The ends of each of the girders are cut at angles and joined together, as by welding, forming the rectangle of the subframe 449. The subframe 449 has through holes near each end of each of the girders in the vertically oriented flanges thereof that are parallel with the elbow 392.

The subframe 449 further includes an inner set 450 of stanchions 452 and 453, and an outer set 451 of stanchions 454 and 455. Each of the stanchions 452, 453, 454, and 455 is metal and has an angle cross section of either unequal or equal flange length, and may be angle iron for ease and simplicity of construction. Each of the stanchions 452, 453, 454, and 455 has first and second flanges thereof oriented outwardly adjacent the outer side of the subframe 449. The stanchions 452, 453, 454, and 455 are attached at the lower ends thereof to the girders, as by welding, on the tops of the girders, and offset inwardly from the outer side of the subframe 449 by an amount equal to the thickness of the vertically oriented flanges of the girders. Alternatively, a foot may be attached, as by welding, to the lower end of each of the stanchions, respectively, and then the feet so attached to the girders and so offset inwardly. Each of the stanchions 452, 453, 454, and 455 has a cap 456, 457, 458, and 459 attached to the upper end thereof, respectively, as by welding. Each of the caps 456, 457, 458, and 459 may be a flat plate, as shown, for ease and simplicity of construction. Each of the caps 456, 457, 458, and 459 has a through hole therein.

The inner set 450 of the stanchions 452 and 453 interconnect the horizontal elbow clamp assembly 424 and the girders of the subframe 449. The outer set 451 of the stanchions 454 and 455 interconnect the vertical elbow clamp assembly 425 and the girders of the subframe 449. The through holes in the side flanges 431 and 432 of the horizontal elbow clamp assembly 424 align with the through holes in the caps 456 and 457 for connecting the caps 456 and 457 with the horizontal elbow clamp assembly 424; and the through holes in the side flanges 440 and 438 of the vertical elbow clamp assembly 425 align with the through holes in the caps 458 and 459 for connecting the caps 458 and 459 with the vertical elbow clamp assembly 425. Fasteners or bolts 460 and 461 pass through the aligned through holes of the side flanges 431 and 432 and the caps 456 and 457, respectively, and are secured, as by nuts when bolts are used, attaching together the horizontal elbow clamp assembly 424 and the subframe 449. Fasteners or bolts pass through the aligned through holes of the side flanges 440 and 438 and the caps 458 and 459, respectively, and are secured, as by nuts when bolts are used, attaching together the vertical elbow clamp assembly 425 and the subframe 449. As shown in FIG. 3, the stanchions 452, 453, 454, and 455 are angled from the vertical.

The horizontal support 408 also includes a set 462 of removable support legs attachable to the subframe 449 for selectively supporting the delivery system 399 upon the floor 92 of the silo 99 by selectively supporting the subframe 449 of the horizontal support 408 of the support system 400 upon the silo floor 92. Each of the removable support legs has first and second flanges thereof oriented outwardly adjacent the outer side of the subframe 449. Fasteners or bolts pass through the through holes in the girders that align with through holes in the flanges of the removable support legs, respectively, and are secured, as by nuts when bolts are used, attaching the removable support legs to the subframe 449. When so attached, the upper ends of the removable support legs are against the inner surfaces of the horizontally oriented flanges of the girders of the subframe 449, and the flanges of the removable support legs are against the inner surfaces of the vertically oriented flanges of the girders of the subframe 449, offsetting the upper ends thereof inwardly from the outer side of the subframe 449 by an amount equal to the thickness of the vertically oriented flanges of the girders so that the upper ends of the removable support legs are directly below the lower ends of the stanchions.

Figure 8:
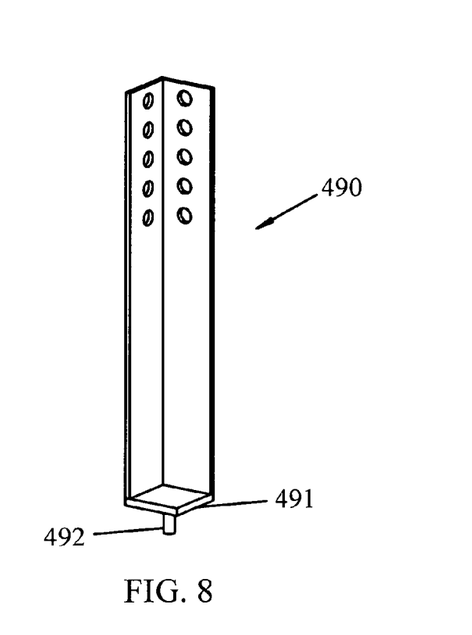
FIG. 8 is a perspective view of another embodiment of a support leg of the horizontal support as shown in FIG. 2.

One embodiment of the removable support legs comprises an integral support leg 490, shown in more detail in FIG. 8, that is premeasured for length to correctly space the subframe 449 from the silo floor 92 for selectively supporting the delivery system 399 upon the silo floor 92. The integral support leg 490 is metal and has an angle cross section of either unequal or, as shown, equal flange length, and may be angle iron for ease and simplicity of construction. The integral support leg 490 has a plurality of through holes in both flanges thereof either in only the upper portion as shown, or alternatively along the full length thereof. One of the through holes in one of the flanges of the integral support leg 490 aligns with one of the through holes in one of the girders for receiving one of the fasteners or bolts. The integral support leg 490 has a foot 491 attached to the lower end thereof, as by welding. The foot 491 may be a flat plate, as shown, for ease and simplicity of construction. The foot 491 has a locking pin 492 attached, as by welding, to the lower surface thereof.

The horizontal support 408 also includes a set of removable support legs attachable to each of the clamp assemblies thereof for selectively supporting the delivery system 399 upon the floor 92 of the silo 99 by selectively supporting the clamp assemblies of the horizontal support 408 of the support system 400 upon the silo floor 92; and in particular, for the embodiment shown in FIG. 2, sets 463 and 464 of removable support legs 465 and 466, and 467 and 468 for the clamp assemblies 409 and 410, respectively.

Figure 7:
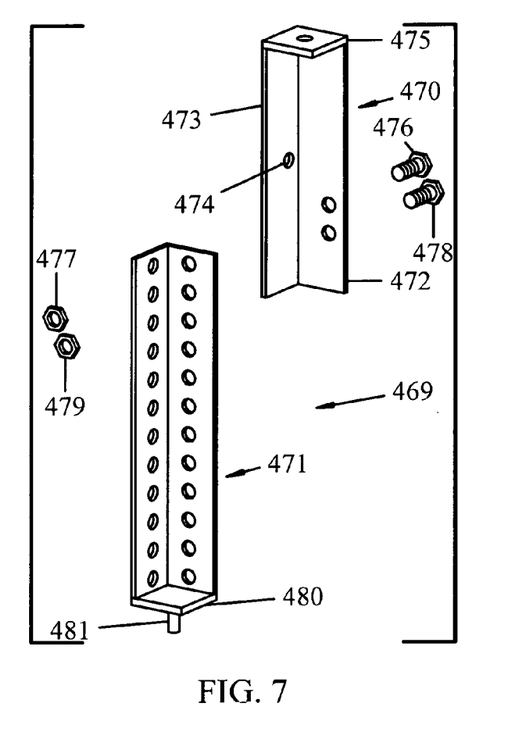
FIG. 7 is a perspective, partially exploded, view of one embodiment of a support leg of the horizontal support as shown in FIG. 2.

One embodiment of the removable support legs 465 and 466, and 467 and 468 of the sets 463 and 464 thereof comprises a separable support leg 469, shown in more detail in FIG. 7. The separable support leg 469 comprises an upper leg section 470 and a lower leg section 471. The upper leg section 470 is metal and has an angle cross section of either unequal or, as shown, equal flange length, and may be angle iron for ease and simplicity of construction. The upper leg section 470 has two through holes in a first flange 472 thereof, and a storing hole 474 in a second flange 473 thereof. The upper leg section 470 has a cap 475 attached to the upper end thereof, as by welding. The cap 475 may be a flat plate, as shown, for ease and simplicity of construction. The cap 475 has a through hole therein. The upper leg section 470 has a standard length and configuration.

The lower leg section 471 is metal and has an angle cross section of either unequal or, as shown, equal flange length, and may be angle iron for ease and simplicity of construction. The lower leg section 471 has a plurality of through holes in both flanges thereof along the full length thereof. Fasteners or bolts 476 and 478 pass through the two through holes in the first flange 472 of the upper leg section 470 that align with two of the through holes in one of the flanges of the lower leg section 471, respectively, and are secured, as by nuts 477 and 479 when bolts are used, attaching the leg sections 470 and 471 together, forming the separable support leg 469. When so attached, the flanges of the lower leg section 471 are against the inner surfaces of the flanges of the upper leg section 470, offsetting the lower end of the lower leg section 471 from the upper end of the upper leg section 470 by an amount equal to the thickness of the flanges of the upper leg section 470.

In the embodiment of the separable support leg 469 as shown in FIG. 7, the lower leg section 471 is of stock material. The correct length is measured, at the silo 99 either during or after installation of the delivery system 399 or the support system 400 or any other convenient time such as when any of the removable separable support legs 465, 466, 467, or 468 or leg sections thereof are replaced, to correctly space each of the clamp assemblies of the horizontal support 408 of the support system 400 from the silo floor 92 for selectively supporting the delivery system 399 upon the silo floor 92. After the correct length has been measured, the lower leg section 471 is cut from the stock material, and a toot 480 is attached to the lower end thereof, as by welding. The foot 480 may be a flat plate, as shown, for ease and simplicity of construction. The foot 480 has a locking pin 481 attached, as by welding, to the lower surface thereof.

Figure 5:
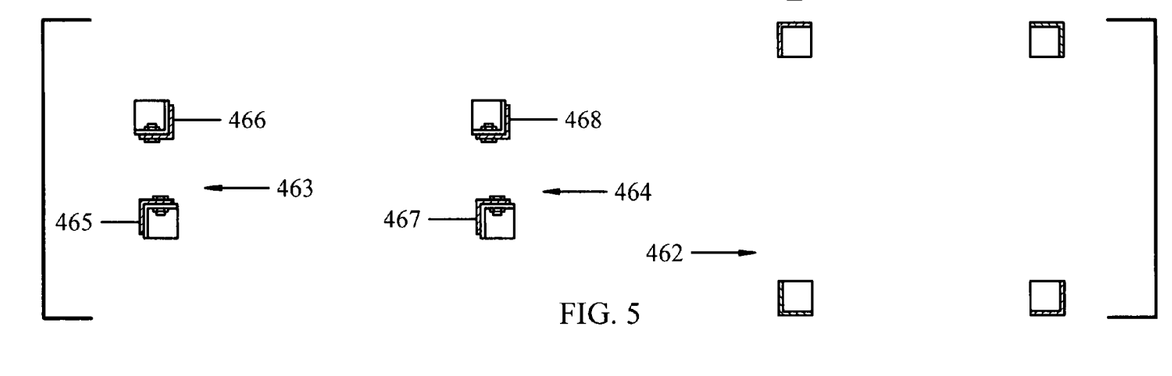
FIG. 5 is a cross-sectional view taken on line 5-5 in FIG. 2 showing the support legs of the horizontal support.

The through holes in the side flanges of the clamp assemblies 409 and 410 of the horizontal support 408 align with the through holes in the caps of the removable support legs 465 and 466, and 467 and 468. As shown in FIG. 2 and FIG. 6, fasteners or bolts 482, 483, 484, and 485 pass through the aligned through holes of these side flanges and these caps, respectively, and are secured, as by nuts when bolts are used, attaching the removable support legs 465 and 466, and 467 and 468 to the clamp assemblies 409 and 410. When so attached, as shown in FIG. 5, the removable support legs 465 and 466, and 467 and 468 are oriented so that the flanges through which the fasteners or bolts 476 and 478 pass to attach the respective leg sections 470 and 471 together are oriented inwardly, parallel with the horizontal section of the delivery system 399, and the other flanges thereof are oriented perpendicularly outwardly. Each upper leg section 470 of the respective removable support legs 465 and 466, and 467 and 468 of each of the sets 463 and 464 thereof are horizontally aligned with each other and the clamp assemblies 409 and 410 thereof, respectively, when so attached; however, due to the offsetting of the lower leg section 471 from the upper leg section 470 of the respective removable support legs 465 and 466, and 467 and 468, the respective lower leg section 471 of each of the sets 463 and 464 of the removable support legs 465 and 466, and 467 and 468 are horizontally offset.

The removable support legs of the horizontal support 408 are rotationally symmetric. As shown in FIG. 5, and further shown in FIG. 2 and FIG. 3, the removable support legs of the set 462 thereof that are attachable to the subframe 449 differ from each other only in orientation by a rotation of ninety degrees about an axis that is parallel with both flanges of the respective removable support leg. As shown in FIG. 5, and further shown in FIG. 2, FIG. 3, and FIG. 4, the removable support legs 465 and 466, and 467 and 468 of each of the sets 463 and 464 thereof that are attachable to the clamp assemblies 409 and 410, respectively, differ from each other only in orientation by a rotation of one hundred eighty degrees, in order from leg 465 to leg 466 and from leg 467 to leg 468, about an axis that is parallel with both flanges of the respective removable support leg. This simplifies construction and maintenance by not requiring to have right-hand and left-hand variants of the removable support legs of the horizontal support 408.

Another embodiment of the removable support legs that are attachable to the subframe 449 comprises a separable support leg, based upon measurements made at the silo 99, identical to the separable support leg 469 hereinbefore described and as shown in FIG. 7 but lacking the cap 475 thereof. Yet other embodiments of the removable support legs that are attachable to the subframe 449 comprise either an integral support leg, identical to the integral support leg 490 hereinbefore described and as shown in FIG. 8, or a separable support leg, identical to the separable support leg 469 hereinbefore described and as shown in FIG. 7, but that also includes a cap attached to the upper end thereof, as by welding.

Another embodiment of the removable support legs that are attachable to the clamp assemblies of the horizontal support 408 comprises a premeasured integral support leg, identical to the integral support leg 490 hereinbefore described and as shown in FIG. 8 but including a cap identically as the separable support leg 469 has the cap 475 hereinbefore described and as shown in FIG. 7.

The removable support legs of the horizontal support 408 selectively support the delivery system 399 upon the floor 92 of the silo 99. Each of the removable support legs is attachable to the horizontal support 408 in either a deployed position thereof or a stored position thereof. When in the deployed positions thereof, the removable support legs of the horizontal support 408 interconnect the horizontal support 408 and the silo floor 92, supporting the delivery system 399 thereupon. The removable support legs of the horizontal support 408 are removable from the deployed positions thereof, and may be placed in the stored positions thereof on the horizontal support 408, to provide an unobstructed floor area for mechanical or manual sweeping of the silo floor 92.

FIG. 2 shows the deployed positions of the removable support legs of the horizontal support 408. For the set 462 of the removable support legs that are attachable to the subframe 449, the fasteners or bolts therefor selectively mount the set 462 of the removable support legs in the deployed positions thereof by removably attaching the removable support legs to the subframe 449, as shown in FIG. 2 and FIG. 3. For the sets 463 and 464 of the removable support legs 465 and 466, and 467 and 468 that are attachable to the clamp assemblies 409 and 410, respectively, the fasteners or bolts 482, 483, 484, and 485 therefor selectively mount the sets 463 and 464 of the removable support legs 465 and 466, and 467 and 468 in the deployed positions thereof by removably attaching the removable support legs 465 and 466, and 467 and 468 to the clamp assemblies 409 and 410, respectively, as shown in FIG. 2, FIG. 4, and FIG. 6.

The locking pins on the feet of the removable support legs of the horizontal support 408, as the locking pin 481 of the foot 480 shown in FIG. 7 and the locking pin 492 of the foot 491 shown in FIG. 8, selectively lock the lower ends of the removable support legs, when the removable support legs are in the deployed positions thereof, by removably fitting into sockets in the silo floor 92, as shown in FIG. 4 for the locking pins 486 and 487 and the sockets 488 and 489 for the set 463 of the removable support legs 465 and 466.

Figure 9:
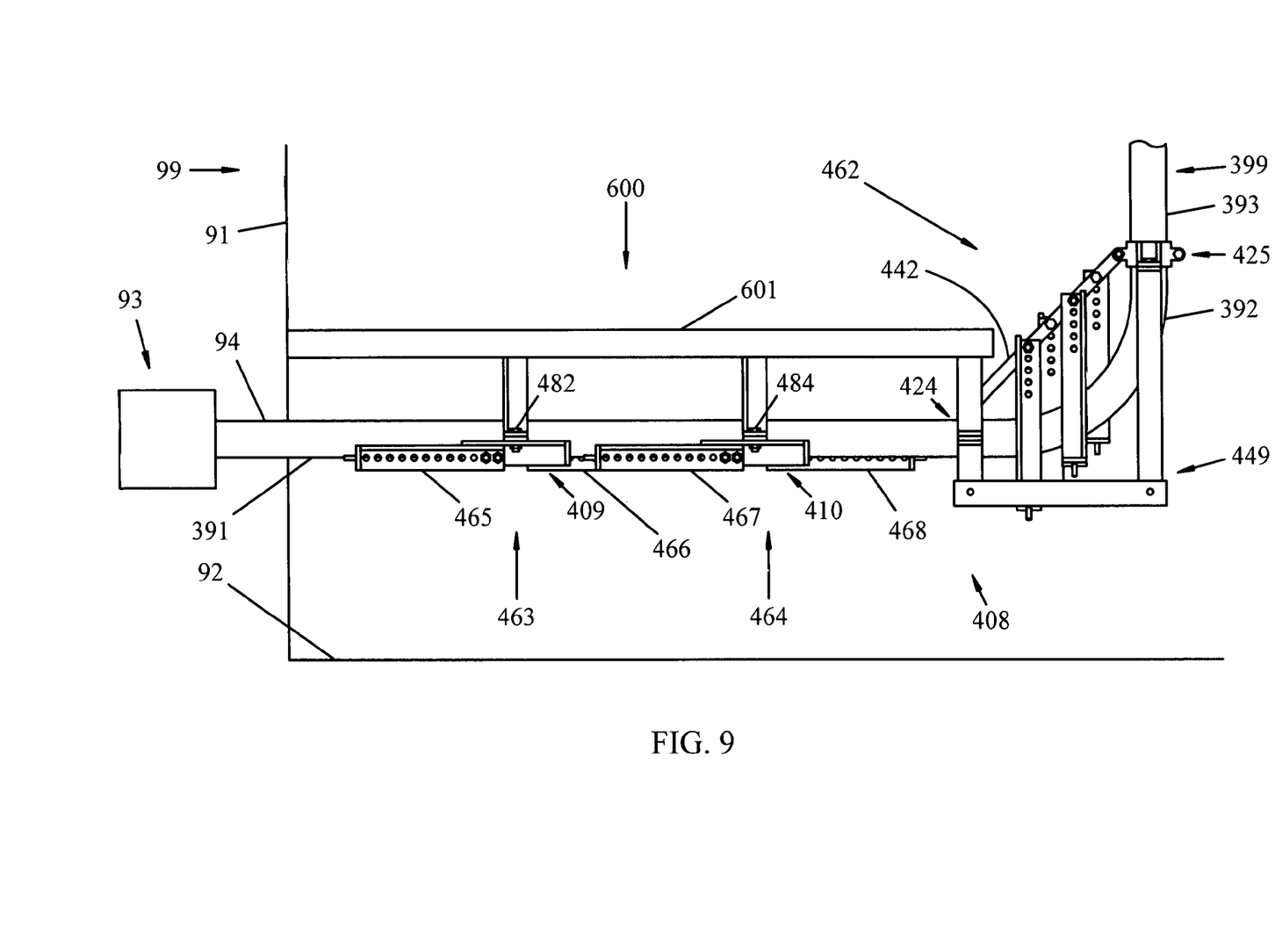
FIG. 9 is a side view of the embodiment of the present invention, as shown in FIG. 2, showing the support legs of the horizontal support in stored positions.

FIG. 9 shows the stored positions of the removable support legs of the horizontal support 408. For the set 462 of the removable support legs that are attachable to the subframe 449, the fasteners or bolts therefor are removed therefrom and the set 462 of the removable support legs are removed from the deployed positions thereof. Subsequently, the removable support legs may be placed adjacent the elbow brace 442 on opposite sides thereof and aligned with every other of the storing holes 445, 446, 447, and 448 thereof for clearance therebetween. When so placed, the fasteners or bolts are then passed through the storing holes 445, 446, 447, and 448 of the elbow brace 442 and the aligned through holes of the removable support legs, respectively, selectively mounting the set 462 of the removable support legs in the stored positions thereof by removably attaching the removable support legs to the elbow brace 442, as shown in FIG. 9.

For the sets 463 and 464 of the removable support legs 465 and 466, and 467 and 468 that are attachable to the clamp assemblies 409 and 410, respectively, the fasteners or bolts 482, 483, 484, and 485 therefor are removed therefrom and the sets 463 and 464 of the removable support legs 465 and 466, and 467 and 468 are removed from the deployed positions thereof. Subsequently, the removable support legs 465 and 466, and 467 and 468 may be placed so that the storing hole 474 of each of the removable support legs 465 and 466, and 467 and 468 is aligned with and below the through hole of the side flange of the clamp assemblies 409 and 410, respectively. When so placed, the fasteners or bolts 482, 483, 484, and 485 are then passed through the through holes of the side flanges of the clamp assemblies 409 and 410 and the aligned storing holes 474 of the removable support legs 465 and 466, and 467 and 468, respectively, selectively mounting the sets 463 and 464 of the removable support legs 465 and 466, and 467 and 468 in the stored positions thereof by removably attaching the removable support legs 465 and 466, and 467 and 468 to the clamp assemblies 409 and 410, respectively, as shown in FIG. 9.

When in the stored positions thereof, the locking pins on the feet of the removable support legs of the horizontal support 408, as the locking pin 481 of the foot 480 shown in FIG. 7 and the locking pin 492 of the foot 491 shown in FIG. 8, are removed from the sockets therefor in the silo floor 92, as shown in FIG. 9.

Another embodiment of the present invention comprises bin sweep bumpers, not shown, to protect a mechanical bin sweep from damage, when the mechanical bin sweep is moving during the emptying of the silo, due to impacting against the removable support legs of the horizontal support when in deployed positions thereof.

Another embodiment of the present invention comprises a deflector 600, shown schematically in FIG. 1. The deflector 600 protects the horizontal section of the delivery system 399 from damage, as by crushing of the horizontal tube 391 thereof, that may occur during delivery of the material into the silo 99 or settling of the material within the silo 99 during storage thereof or during emptying of the material from the silo 99.

Figure 10:
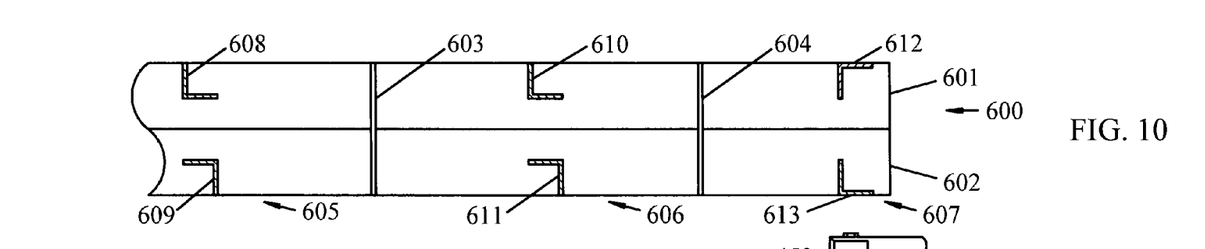
FIG. 10 is a cross-sectional view, partly broken, taken on line 10-10 in FIG. 2 showing the deflector and the stanchions thereof.

The deflector 600 has at least one angled wall, and in particular, for the embodiment shown in FIG. 4 and FIG. 10 and also FIG. 2 and FIG. 3, a first angled wall 601 and a second angled wall 602. The walls 601 and 602 of the deflector 600 are flat metal, and are formed from a single piece of metal bent into an inverted V shape for ease and simplicity of construction. Alternatively, the walls of the deflector 600 may be formed from a plurality of pieces; and alternatively, the walls of the deflector 600 may be curved. A plurality of crossbeams, and in particular, for the embodiment shown in FIG. 10, crossbeams 603 and 604, interconnect and reinforce the angled walls 601 and 602, and are attached thereto, as by welding.

The deflector 600 further includes a set of stanchions, attached to each of the clamp assemblies of the horizontal support 408 of the support system 400 that is mounted on the horizontal tube 391 of the horizontal section of the delivery system 399, for supporting the deflector 600 above generally the horizontal section of the delivery system 399; and in particular, for the embodiment shown in FIG. 2, FIG. 6, and FIG. 10, sets 605, 606, and 607 of stanchions 608 and 609, 610 and 611, and 612 and 613 for the clamp assemblies 409, 410, and 424, respectively.

Each of the stanchions 608 and 609, 610 and 611, and 612 and 613 is metal and has an angle cross section of either unequal or, as shown, equal flange length, and may be angle iron for ease and simplicity of construction. Each of the stanchions 608 and 609, 610 and 611, and 612 and 613 has first and second flanges thereof oriented identically with the flanges of the removable support legs 465 and 466, and 467 and 468 and the stanchions 452 and 453, respectively, as shown in FIG. 6 and FIG. 5. The upper ends of the stanchions 608 and 609, 610 and 611, and 612 and 613 are cut at an angle to match the angle of the deflector walls 601 and 602, and are attached to the deflector walls 601 and 602, as by welding. Each of the stanchions 608 and 609, 610 and 611, and 612 and 613 has a foot 614 and 615, 616 and 617, and 618 and 619 attached to the lower end thereof, respectively, as by welding. Each of the feet 614 and 615, 616 and 617, and 618 and 619 may be a flat plate, as shown, for ease and simplicity of construction. Each of the feet 614 and 615, 616 and 617, and 618 and 619 has a through hole therein.

The through holes in the side flanges of the clamp assemblies 409, 410, and 424 align with the through holes in the feet 614 and 615, 616 and 617, and 618 and 619, respectively. As shown in FIG. 6, the fasteners or bolts 482, 483, 484, 485, 460, and 461 pass through the aligned through holes of the side flanges of the clamp assemblies 409, 410, and 424 and of the feet 614 and 615, 616 and 617, and 618 and 619, respectively, and are secured, as by nuts when bolts are used, attaching together the deflector 600 and the clamp assemblies 409, 410, and 424 of the horizontal support 408. When so attached and when the removable support legs 465 and 466, and 467 and 468 are in the deployed positions thereof as shown in FIG. 2, the feet of the deflector 600 and the caps of the sets 463 and 464 of the removable support legs of the horizontal support 408 and of the inner set 450 of the stanchions of the subframe 449 sandwich the side flanges of the clamp assemblies 409, 410, and 424, respectively, as shown in FIG. 2, FIG. 3, and FIG. 4. When so attached and when the removable support legs 465 and 466, and 467 and 468 are in the deployed positions thereof as shown in FIG. 2, the flanges of the stanchions 608 and 609, 610 and 611, and 612 and 613 of the deflector 600 align with the flanges of the removable support legs 465 and 466, and 467 and 468 and of the stanchions 452 and 453, respectively, as shown in FIG. 2, FIG. 5, and FIG. 6.

As shown in FIG. 4, the deflector 600 also has a flange 620 that is mechanically fastened or bolted to the silo wall 91 for connecting and supporting the end of the deflector 600 adjacent to the silo wall 91 thereto.

This description of the present invention is not intended to be limited to only metal materials. Plastic and rubber may also be substituted for any or all parts. The present invention also lends itself to colorful displays including confectionaries through the use of clear glass or clear plastic materials.

Operation

The delivery system 399 of the present invention operates to automatically sequentially fill the storage silo 99 with the material when the material is transported to the silo 99 by a conveyor entraining the material within a flow of fluid. In the embodiment of the present invention shown in FIG. 1, that conveyor is the conventional pneumatic conveyor 93 that entrains the material within a flow of air for depositing the material into the silo 99.

In one embodiment of the present invention that operates to automatically sequentially fill the storage silo 99, the pneumatic conveyor 93 operates at a relatively lower pressure. As the pneumatic conveyor 93 begins to convey the pneumatic material flow into the delivery system 399, filling of the storage silo 99 commences. The horizontal tube 391 of the delivery system 399 receives the pneumatic material flow from the pneumatic conveyor 93 and conveys the pneumatic material flow into the silo 99. The elbow 392 directs the pneumatic material flow from the horizontal tube 391 vertically into the vertical tube 393 that conveys the pneumatic material flow upwardly and downstream within the silo 99.

In this one embodiment of the present invention, the vertical tube 393 conveys the pneumatic material flow upwardly and downstream into the first material separator of the delivery system 399, which in the embodiment shown in FIG. 1 is the upstream separator 394. The pneumatic material flow expands from the inlet of the first material separator into the increased diametric volume of the forcing cone within the material separator. Insufficient air pressure results in a choking action within the material separator, specifically within the volume of the forcing cone of the material separator, separating the material from the airflow. A flow of the separated material is automatically deposited downwardly by gravity out of the material separator through the outlet thereof and into the silo 99, forming a mound of the separated material having a material surface. The airflow is rapidly released upwardly through the outlet tube of the material separator and also downwardly through the outlet thereof. The released air is vented from the silo 99 through equalizing vents (not shown).

As the material separator, specifically the upstream separator 394, continues to separate the material in accordance with the embodiment of the present invention, the flow of the separated material raises the level of the material surface within the silo 99 to eventually meet with and block the outlet of the material separator. This blocking of this outlet automatically stops the flow, and the depositing, of the separated material being deposited out of the material separator through the outlet thereof into the silo 99. The air pressure within the material separator rises to be sufficient for continued downstream conveying, automatically stopping the separating within the material separator. The pneumatic material flow reestablishes within the material separator.

The outlet tube, which in the embodiment shown in FIG. 1 is the vertical tube 395, of the material separator conveys the reestablished pneumatic material flow upwardly and downstream into the material separator of the delivery system 399 that is the next material separator that is downstream of the first material separator. In the embodiment shown in FIG. 1, that next material separator is the downstream separator 396. The downstream separator 396, which is that next material separator, then separates the material from the airflow in the identical operation as that of the previous material separator (the upstream separator 394 in the embodiment shown in FIG. 1). The flow of the separated material is deposited out of the downstream separator 396 onto the mound of the material that had been deposited out of the upstream separator 394, the separated material falling at most only as far as the previous material separator (the upstream separator 394 in the embodiment shown in FIG. 1), again raising the level of the material surface.

This operation of separating the material, flowing the material, depositing the material, then stopping the flowing and the depositing of the material by blocking the outlet, and then reestablishing the pneumatic material flow to convey upwardly the pneumatic material flow into the next material separator that is downstream is, repeated for each of the material separators of the delivery system 399 in sequence from the bottom of the silo 99 to the top of the silo 99. The final separator in this sequence is the top separator 398, which operates similarly as all the other material separators operate. The cap of the top separator 398 redirects any flow through the second outlet of the top separator 398 downwardly and out of the top separator 398 into the silo 99.

In another embodiment of the present invention that operates to automatically sequentially fill the storage silo 99, the pneumatic conveyor 93 operates at a relatively higher pressure. Again, as the pneumatic conveyor 93 begins to convey pneumatic material flow, which is identical to the pneumatic material flow hereinbefore described except that the airflow from the blower of the pneumatic conveyor 93 is at the relatively higher pressure, into the delivery system 399, filling of the storage silo 99 commences. The horizontal tube 391 of the delivery system 399 receives the pneumatic material flow from the pneumatic conveyor 93 and conveys the pneumatic material flow into the silo 99. The elbow 392 directs the pneumatic material flow from the horizontal tube 391 vertically into the vertical tube 393 that conveys the pneumatic material flow upwardly and downstream within the silo 99.

In this other embodiment of the present invention, the vertical tube 393 conveys the pneumatic material flow upwardly and downstream into the first material separator of the delivery system 399, which in the embodiment shown in FIG. 1 is the upstream separator 394. The pneumatic material flow continues approximately unchanged from the inlet of the first material separator into the increased diametric volume of the forcing cone within the material separator to the through aperture thereof, expanding by only a small percentage. Most of the pneumatic material flow flows through the through aperture of the material separator upwardly to the distal side of the through aperture into the cylindrical volume of the outlet tube of the material separator. Insufficient air pressure results in a choking action within the material separator, specifically within the cylindrical volume of the outlet tube of the material separator, separating the material from the airflow, automatically resulting in a gravimetric flow of the separated material downwardly within the cylindrical volume of the outlet tube thereof, through the through aperture of the material separator to the proximal side of the through aperture, and downwardly within the volume of the forcing cone of the material separator. The flow of the separated material is downwardly through an outer annular portion of the through aperture of the material separator simultaneously with the pneumatic material flow that is upwardly through an inner central portion of the through aperture of the material separator. The outer annular portion and the inner central portion are generally coaxial with this through aperture. The flow of the separated material is automatically deposited downwardly by gravity out of the material separator through the outlet thereof and into the silo 99, forming a mound of the separated material having a material surface. The airflow is rapidly released upwardly through the upper portion of the outlet tube of the material separator; some of the airflow is also released downwardly through the outlet thereof. The released air is vented from the silo 99 through equalizing vents (not shown).

As the material separator, specifically the upstream separator 394, continues to separate the material in accordance with this other embodiment of the present invention, the flow of the separated material raises the level of the material surface within the silo 99 to eventually meet with and block the outlet of the material separator. This blocking of this outlet automatically stops the flow, and the depositing, of the separated material being deposited out of the material separator through the outlet thereof into the silo 99. The air pressure within the material separator rises to be sufficient for continued downstream conveying, automatically stopping the separating within the material separator. The pneumatic material flow reestablishes within the material separator.

The outlet tube, which in the embodiment shown in FIG. 1 is the vertical tube 395, of the material separator conveys the reestablished pneumatic material flow upwardly and downstream into the material separator of the delivery system 399 that is the next material separator that is downstream of the first material separator. In the embodiment shown in FIG. 1, that next material separator is the downstream separator 396. The downstream separator 396, which is that next material separator, then separates the material from the airflow in the identical operation as that of the previous material separator (the upstream separator 394 in the embodiment shown in FIG. 1). The flow of the separated material is deposited out of the downstream separator 396 onto the mound of the material that had been deposited out of the upstream separator 394, the separated material falling at most only as far as the previous material separator (the upstream separator 394 in the embodiment shown in FIG. 1), again raising the level of the material surface.

This operation of separating the material, flowing the material, depositing the material, then stopping the flowing and the depositing of the material by blocking the outlet, and then reestablishing the pneumatic material flow to convey upwardly the pneumatic material flow into the next material separator that is downstream is repeated for each of the material separators of the delivery system 399 in sequence from the bottom of the silo 99 to the top of the silo 99. The final separator in this sequence is the top separator 398, which operates in accordance with the embodiment of the present invention operating at the relatively lower pressure as hereinbefore described. The cap of the top separator redirects any flow through the second outlet of the top separator 398 downwardly and out of the top separator 398 into the silo 99.

Thus, for each separator, in each of the two embodiments of the present invention of operating thereof, the separator functions selectively in either one of two modes of operation. In one mode of operation, the separator separates the material from the airflow entraining the material and flows the separated material through the outlet thereof. In another mode of operation, the airflow entraining the material flows through the separator without separating the material therefrom and without flowing separated material through the outlet thereof. The selection between the two modes of operation is automatic, based on whether the surface of the mound of the deposited material does or does not block the outlet of the separator through which the separated material is deposited onto the mound. The selectively separating and selectively flowing requires no moving parts. Thus, for each separator, the separator selectively separates the material and selectively flows the separated material into the silo to sequentially fill the silo up to the height that the separator is located within the silo.

Further, the vertical support 401 of the embodiment shown in FIG. 1 has a plurality of the clamp assemblies to suspend and center the series of the tubes and the separators of the delivery system of the present invention. Simultaneously, the clamp assemblies, with the sets of braces thereof and the respective wall brackets, reinforce the silo wall against collapse of the silo by resisting the bowing outwards of the silo wall from the weight of the delivery system, the weight and any movement of the stored granular material within the silo, etc.; and, if the braces are rods, by also resisting the bowing inwards of the silo wall therefrom. The clamp assemblies are structurally attached to the silo wall through the sets of braces and the plurality of brackets to distribute pressure. The distribution of the wall brackets throughout the silo provides even weight transfer to the silo wall. The two equal half clamps of the clamps of the clamp assemblies simplify construction. The clamps of the clamp assemblies provide for even load transfer and stabilization through the application of opposing clamp brackets. Suspension of the delivery system of the present invention within the silo also provides an unobstructed floor area for mechanical or manual sweeping.

In yet another embodiment of the present invention, the material stored within the storage silo 99, having a support system 400 supporting a delivery system 399 as shown schematically in FIG. 1, is removed therefrom when emptying the silo 99. In order to provide the silo floor 92 to be unobstructed by the support legs of the horizontal support 408 of the support system 400 for mechanical or manual sweeping of the silo floor 92, the removable support legs of the horizontal support 408 are removed from the deployed positions thereof, and may be placed in the stored positions thereof on the horizontal support 408.

In this yet other embodiment of the present invention, the material is extracted from the silo 99, as is known in the art, until the set 462 of the removable support legs attached to the subframe 449 is accessible out of the material. The interior of the silo 99 is accessed through a manual access port (not shown). This set 462 of the removable support legs is removed from the deployed positions thereof, shown in FIG. 2, by removing the fasteners or bolts attaching the removable support legs to the subframe 449 and subsequently moving the upper portions of the removable support legs toward each other. This separates the removable support legs from the subframe 449 and removes the locking pins thereof from the sockets therefor in the silo floor 92.

As shown in FIG. 9, this set 462 of the removable support legs may be placed in the stored positions thereof by placing the removable support legs adjacent the elbow brace 442 on opposite sides thereof. Each of the removable support legs is rotated vertically ninety degrees so that one of the flanges thereof is adjacent the elbow brace and the other of the flanges thereof extends outwardly away therefrom, as shown in FIG. 9. Through holes of the removable support legs are aligned with every other of the storing holes of the elbow brace 442 for clearance between the removable support legs. When so placed, the fasteners or bolts are then passed through the storing holes of the elbow brace 442 and the aligned through holes of the removable support legs, respectively, and loosely secured, attaching the removable support legs to the elbow brace 442 for removably storing the removable support legs to the elbow brace 442 in the stored positions thereof. The removable support legs hang downwardly from the elbow brace 442 at an angle from vertical against the elbow 392 of the delivery system 399.

The silo 99 may be equipped with the bin sweep having the plurality of the bin sweep bumpers. The bin sweep may be advantageously previously positioned, when the silo 99 is approximately empty, in front of and near the removable support legs of the horizontal support 408 such that the bin sweep makes a maximum revolution before any of the bumpers thereof bumps into any of the removable support legs.

When the silo 99 is so equipped, subsequently the bin sweep is operated to continue to extract more of the material until one of the bumpers bumps into the next removable support leg, that is next spaced radially outwardly from the removable support legs attachable to the subframe 449, still mounted in the deployed position thereof, and in particular one of the removable support legs of the set 464 thereof attached to the clamp assembly 410. The bin sweep is then stopped. This removable support leg is removed from the deployed position thereof by removing the fastener or bolt 484 or 485 attaching this removable support leg to the side flange of the clamp assembly 410 and subsequently moving the upper portion of this removable support leg away from the clamp assembly 410. This separates this removable support leg from the side flange of the clamp assembly 410 and removes the locking pin thereof from the socket therefor in the silo floor 92.

This removable support leg may be placed in the stored position thereof, as shown in FIG. 9, by placing the storing hole 474 of this removable support leg aligned with and below the through hole of the side flange of the clamp assembly 410. This removable support leg is rotated ninety degrees from the vertical to the horizontal clockwise, as shown in FIG. 9. When so placed, the fastener or bolt 484 or 485 is then passed through the through hole of the side flange of the clamp assembly 410 and the aligned storing hole 474 of this removable support leg and secured, as by the nut when the bolt is used, attaching this removable support leg to the clamp assembly 410 for removably storing this removable support leg to the clamp assembly 410 in the stored position thereof.

When so rotated clockwise, the removable support legs, as the legs 466 and 468, attached to the clamp assemblies 409 and 410 of the horizontal support 408 on one side, as shown in FIG. 6, orient so that the locking pins thereof are oriented inwardly of the silo 99, as shown in FIG. 9. When the removable support legs, as the legs 465 and 467, attached to the clamp assemblies 409 and 410 of the horizontal support 408 on the opposite side, as shown in FIG. 6, are so rotated clockwise, they orient so that the locking pins thereof are oriented outwardly of the silo 99, as shown in FIG. 9.

Subsequently the bin sweep is again operated to continue to extract more of the material until one of the bumpers bumps into another of the removable support legs, that is so spaced radially outwardly, still mounted in the deployed position thereof, and in particular one of the removable support legs of the set 463 thereof attached to the clamp assembly 409. The bin sweep is then stopped again. This removable support leg is likewise removed from the deployed position thereof as was the previous removable support leg, and likewise may be placed in the stored position thereof.

This sequentially operating the bin sweep until one of the bumpers bumps into another of the removable support legs still mounted in the deployed position thereof, stopping the bin sweep, and then removing that support leg which then may be placed in the stored position thereof continues until all of the removable support legs that are in the deployed positions thereof are so removed which then may be so placed stored. Afterwards, the silo floor 92 is unobstructed by the removable support legs of the horizontal support 408 of the support system 400, and the bin sweep can be operated without damage thereto, and/or manual sweeping can occur, to continue to extract more of the material from the silo 99.

I claim:

1. A system for protecting a horizontal section of an outlet of a conveyor depositing material, wherein the outlet deposits the material to a storage comprising a wall, and wherein the outlet is within the storage, wherein said system comprises:
    at least one clamp assembly mounted on the horizontal section;
    a deflector for protecting the horizontal section, wherein said deflector comprises:
        an end adjacent to the storage wall, and
        a flange fastened to the storage wall for supporting said end; and
    a set of stanchions attached to each respective said clamp assembly and to said deflector for supporting said deflector above the horizontal section.

2. The system of claim 1, wherein said deflector further comprises:
    a first angled wall;
    a second angled wall; and
    a plurality of crossbeams interconnecting said angled walls for reinforcing said deflector.

3. The system of claim 1, wherein each said stanchion comprises an angle iron comprising a first flange and a second flange.

4. A system for protecting a horizontal section of an outlet of a conveyor depositing material, wherein said system comprises:
    at least one clamp assembly mounted on the horizontal section, wherein each said clamp assembly comprises:
        two equal halves each having two ends and an outer side having an outer surface,
        fasteners joining together said equal halves, and
        a flange for each said equal half perpendicular to said outer surface of said side thereof;
    a deflector for protecting the horizontal section;
    a set of stanchions attached to each respective said clamp assembly and to said deflector for supporting said deflector above the horizontal section, wherein each said stanchion comprises:
        a lower end, and
        a foot attached to said lower end; and
    fasteners each attaching one said foot to one said flange, respectively.

5. The system of claim 4, wherein said deflector comprises:
    a first angled wall;
    a second angled wall; and
    a plurality of crossbeams interconnecting said angled walls for reinforcing said deflector.

6. The system of claim 4, wherein each said stanchion further comprises an angle iron.

7. A system for supporting an outlet of a conveyor depositing material to a storage, wherein the outlet is within the storage, and wherein the outlet comprises a horizontal section and a vertical section and at least an elbow interconnecting the sections, wherein said system comprises:
    a vertical support comprising:
        at least one clamp assembly mounted on the vertical section, and
        a set of braces connected to each respective said clamp assembly of said vertical support for suspending the outlet within the storage;
    a horizontal support comprising:
        at least one clamp assembly mounted on the horizontal section, and
        a set of removable support legs attachable to each respective said clamp assembly of said horizontal support for selectively supporting the outlet within the storage;
    a deflector for protecting the horizontal section; and
    a set of stanchions attached to each said respective clamp assembly of said horizontal support and to said deflector for supporting said deflector above the horizontal section;
    wherein said support legs each has a deployed position, when attached to said respective clamp assembly of said horizontal support, for supporting the outlet within the storage.

8. The system of claim 7, wherein each said stanchion comprises:
    a lower end, and
    a foot attached to said lower end;
    wherein each said clamp assembly of said horizontal support comprises:
        two equal halves each having two ends and an outer side having an outer surface,
        fasteners joining together said equal halves, and
        a flange for each said equal half perpendicular to said outer surface of said side thereof; and
    wherein said system further comprises:
        fasteners each attaching one said foot to one said flange, respectively.

9. The system of claim 8, wherein each said support leg comprises:
    an upper end, and
    a cap attached to said upper end; and wherein:
said one foot and one said cap sandwich said one flange, respectively, and
said fasteners, that attach said feet to said flanges respectively, also removably attach, to said flanges, said support legs at said caps, respectively, when in said deployed positions thereof.

10. The system of claim 7, wherein said deflector comprises:
a first angled wall;
a second angled wall; and
a plurality of crossbeams interconnecting said angled walls for reinforcing said deflector.

11. The system of claim 7, wherein the storage comprises a wall; and
wherein said deflector comprises:
an end adjacent to the storage wall, and
a flange fastened to the storage wall for supporting said end.

* * * * *

UNITED STATES PATENT AND TRADEMARK OFFICE
CERTIFICATE OF CORRECTION

| | |
|---|---|
| PATENT NO. | : 9,840,377 B2 |
| APPLICATION NO. | : 15/330515 |
| DATED | : December 12, 2017 |
| INVENTOR(S) | : Phillip Douglas |

It is certified that error appears in the above-identified patent and that said Letters Patent is hereby corrected as shown below:

In the Specification

Column 17, Line 38, "is, repeated" should read --is repeated--.

Signed and Sealed this
First Day of May, 2018

Andrei Iancu
*Director of the United States Patent and Trademark Office*